No. 784,103. PATENTED MAR. 7, 1905.
J. BURKE.
DYNAMO ELECTRIC MACHINE.
APPLICATION FILED JULY 18, 1904.
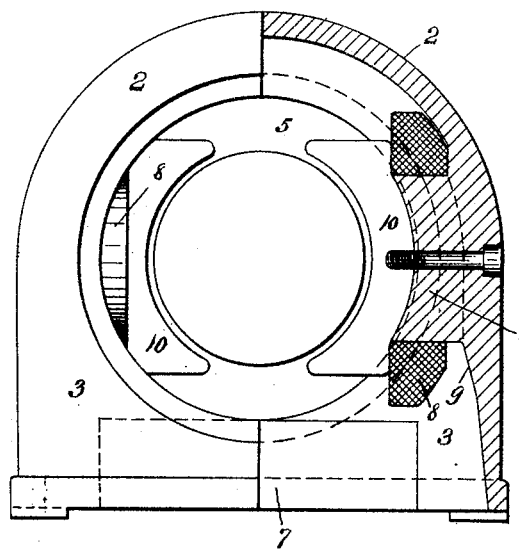
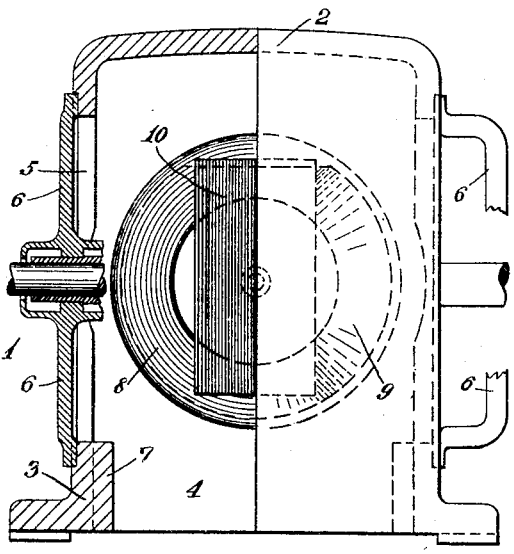
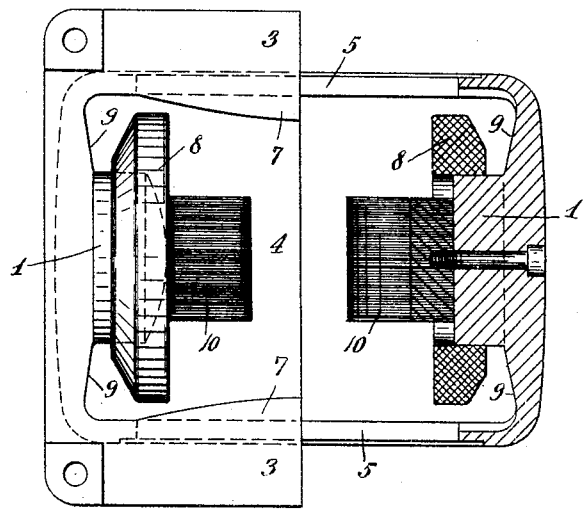
Witnesses
John Aitken
L. A. Sager
James Burke Inventor
By his Attorney C. V. Edwards No. 784,103. Patented March 7, 1905.

UNITED STATES PATENT OFFICE.

JAMES BURKE, OF NEW YORK, N. Y., ASSIGNOR TO BURKE ELECTRIC COMPANY, A CORPORATION OF NEW JERSEY.

DYNAMO-ELECTRIC MACHINE.

SPECIFICATION forming part of Letters Patent No. 784,103, dated March 7, 1905.

Application filed July 18, 1904. Serial No. 216,985.

*To all whom it may concern:*

Be it known that I, JAMES BURKE, a citizen of the United States, residing at New York, in the county of New York and State of New York, have invented certain new and useful Improvements in Dynamo-Electric Machines, of which the following is a full, clear, and exact specification.

This invention relates to dynamo-electric machines; and its object is to provide a machine which shall be well ventilated, in which the various parts shall be readily accessible, in which a minimum of material will be required, and which will be compact and small in size for a given output.

The invention will be more fully described with reference to the machine illustrated in the accompanying drawings, in which—

Figure 1 is an end elevation, partly in section and with certain parts removed. Fig. 2 is a side elevation partly in section; and Fig. 3 is a plan elevation, partly in section, looking from the bottom.

In the drawings the field-magnet frame is shown as an integral inverted-U-shaped casting carrying the field-poles 1 1. The upper portion 2 of the magnet-frame forms a magnetic path from pole to pole in substantially the same manner as has heretofore been customary. The lower portion 3 of the field-magnet is so arranged as to leave the under surface of the armature substantially exposed through the bottom of the machine. As shown in the drawings, this may be done by making the lower side portions which serve as bases also serve to carry the magnetic flux, thus forming the large opening 4 in the bottom of the machine. The ends of the field-frame are provided with the openings 5 5, the edges of which may be adapted to receive and support brackets 6 6, in which may be carried the armature-bearings. The openings 5 5 are preferably circular, and the lower side portions 3 may be provided with enlarged portions 7, the cross-section of which increases in proportion to the decrease in the cross-section of the side portion due to the openings 5. The relative proportions of the portions 2 and 3 will be calculated according to individual conditions, the aggregate cross-section of the parts being made sufficient to carry the desired magnetic flux.

Around the base of the poles 1 is formed an annular beveled portion 9 in order that when the field-coils 8 are put in place an annular ventilating-space will be left between the coil and magnet-frame, thus securing ventilation of the coil. The beveled portion also serves to distribute the magnetic flux from the pole to the yoke.

The poles may of course be solid or laminated and attached to the field-frame in any suitable manner. I prefer the construction shown in the drawings, in which the pole is cast integral with the field-frame and laminated pole-faces 10 are bolted to the poles.

It will be noted that in the construction described the parts requiring ventilation—such as armature, field-coils, &c.—are directly exposed to currents of air passing through the opening in the bottom of the machine.

The machine should be supported so as to allow a free flow of air through the bottom, and in case the machine is to rest on a plane surface feet should be provided to raise the machine somewhat. In the drawings such feet are shown at the four corners.

The ventilating air-currents have free access into the machine and through the same by reason of the bottom and end openings, a strong circulation of air being established through the same. Moreover, in building and repairing the machine all of the parts are accessible through the bottom opening, which enables the parts to be machined at less cost and to be more readily assembled. At the same time the field-magnet construction as a whole is easily cast and machined and utilizes to the fullest extent the metal in a given machine.

It will be understood that the construction above described may be modified in various respects without departing from the invention, and I therefore desire it to be understood that I do not herein limit myself to the specific construction shown.

Having thus described my invention, I de- clare that what I claim as new, and desire to secure by Letters Patent, is—

1. In a dynamo-electric machine, a frame having a central opening through its bottom portion, the said opening communicating directly with the space between the field-poles and affording free access to said poles and the coils thereon, said field-poles projecting radially inward.

2. A field-magnet frame for dynamo-electric machines provided with openings in the bottom and end portions, the aggregate cross-section of the frame throughout being substantially equal to the cross-section of the poles.

3. A field-magnet frame for dynamo-electric machines, the base of which comprises two paths, each adapted to carry the magnetic flux, and separated from each other to form an opening in the bottom of the machine, substantially as described.

4. A field-magnet frame comprising a housing having an opening at its bottom, said opening being formed within side portions which are adapted to carry the magnetic flux, and said frame having poles which project radially inward, substantially as described.

5. A dynamo-electric machine having a ∩-shaped field-frame and having an opening through the bottom, said field-frame encompassing both the field-poles and the coils thereon, substantially as described.

6. A dynamo-electric machine having a ∩-shaped field-magnet open at the bottom, and side connections for the ends of said magnet adapted to carry the magnetic flux, substantially as described.

7. In a dynamo-electric machine, the combination of an inverted-U-shaped integral field-frame having side portions connecting the four corners, and side brackets for supporting the armature, substantially as described.

8. In a dynamo-electric machine, a frame having ventilating-openings through the ends thereof and a ventilating-opening through its bottom portion, the said opening at the bottom communicating directly with the space between the field-poles, the said field-poles projecting radially inward from said frame, and field-coils carried by said poles.

9. In a dynamo-electric machine, a frame having ventilating-openings through the ends thereof and a ventilating-opening through the center of its bottom portion, the said opening at the bottom communicating directly with the space between the field-poles, the said field-poles projecting radially inward from said frame, and field-coils carried by said poles.

10. In a dynamo-electric machine, a frame having ventilating-openings through the ends thereof, and a ventilating-opening through its bottom portion, the said opening at the bottom communicating directly with the space between the field-poles, the said field-poles projecting radially inward from said frame, and the bottom portion of said frame serving to conduct magnetism from pole to pole.

11. In a dynamo-electric machine, a frame having ventilating-openings through the ends thereof and a ventilating-opening through its bottom portion, the said opening at the bottom being formed by side portions on said frame, said side portions serving to conduct magnetism from pole to pole, and the said poles projecting radially inward.

12. In a dynamo-electric machine, a frame having an opening through its bottom portion, the said opening communicating directly with the space between the field-poles, said field-poles projecting radially inward and said opening being formed within side portions of said frame, said side portions serving to conduct magnetism from pole to pole.

13. In a dynamo-electric machine, a frame having a central opening through its bottom portion, the said opening communicating directly with the space between the field-poles, said field-poles projecting radially inward and said opening being formed within side portions of said frame.

14. In a dynamo-electric machine, the combination of an armature and a field-magnet frame, said frame having circumferential and end openings and poles which project radially inward, and field-coils carried by said poles, said circumferential opening communicating directly with the space between said poles.

In testimony whereof I affix my signature in presence of two witnesses.

JAMES BURKE.

Witnesses:
 JOHN AITKEN,
 L. R. SAGER.